United States Patent
Patel et al.

(10) Patent No.: US 11,307,802 B2
(45) Date of Patent: Apr. 19, 2022

(54) NVME QUEUE MANAGEMENT MULTI-TIER STORAGE SYSTEMS

(71) Applicant: International Business Machines Corporation, Armonk, NY (US)

(72) Inventors: Kushal Patel, Pune (IN); Sarvesh S. Patel, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/796,999

(22) Filed: Feb. 21, 2020

(65) Prior Publication Data
US 2021/0263677 A1    Aug. 26, 2021

(51) Int. Cl.
G06F 3/06 (2006.01)
G06F 9/50 (2006.01)
G06F 9/54 (2006.01)

(52) U.S. Cl.
CPC .......... *G06F 3/0659* (2013.01); *G06F 3/0604* (2013.01); *G06F 3/0611* (2013.01); *G06F 3/0644* (2013.01); *G06F 3/0647* (2013.01); *G06F 3/0653* (2013.01); *G06F 3/0664* (2013.01); *G06F 3/0679* (2013.01); *G06F 9/505* (2013.01); *G06F 9/5016* (2013.01); *G06F 9/546* (2013.01); *G06F 2209/508* (2013.01)

(58) Field of Classification Search
CPC ...... G06F 3/0659; G06F 9/505; G06F 3/0604; G06F 3/0653; G06F 3/0664; G06F 3/0647; G06F 9/546; G06F 3/0679; G06F 3/0644; G06F 9/5016; G06F 3/0611; G06F 2209/508; G06F 9/5083; G06F 3/0607; G06F 3/067

USPC .................................................. 711/154, 100
See application file for complete search history.

(56) References Cited

U.S. PATENT DOCUMENTS

| | | | |
|---|---|---|---|
| 2012/0036327 A1* | 2/2012 | Jennas, II | G06F 3/0685 711/137 |
| 2016/0179390 A1* | 6/2016 | Guo | G06F 3/0653 711/154 |

(Continued)

OTHER PUBLICATIONS

Mell et al., "The NIST Definition of Cloud Computing", Recommendations of the National Institute of Standards and Technology, Sep. 2011, U.S. Department of Commerce, 7 pages.

*Primary Examiner* — David Yi
*Assistant Examiner* — Zubair Ahmed
(74) *Attorney, Agent, or Firm* — Daniel M. Yeates

(57) ABSTRACT

A computer-implemented method manages I/O queues in a multi-tier storage system. The method includes identifying a set of subsystems in a multi-tier storage system, and each subsystem in the set of subsystems are communicatively connected to the storage system via a non-volatile memory express (NVMe) protocol and correlated to a tier of the multi-tier storage system. The method includes, determining a workload of each extent, wherein each extent of the set of extents are stored on one subsystem and the extents are accessed by an application. The method further includes, mapping, based on the workload of each extent, each extent to a core of the plurality of cores, wherein the mapping is configured to such that each core is balanced. The method includes, establishing, based on the mapping, an IOQ for each extent, wherein the IOQ is processed by the core to which it is mapped.

20 Claims, 6 Drawing Sheets

(56) References Cited

U.S. PATENT DOCUMENTS

| | | |
|---|---|---|
| 2017/0083252 A1 | 3/2017 | Singh et al. |
| 2018/0018379 A1* | 1/2018 | Eda ................... G06F 16/185 |
| 2018/0107766 A1* | 4/2018 | Dumitrescu ........... G06F 9/546 |
| 2019/0158428 A1 | 5/2019 | Gray et al. |
| 2019/0310892 A1* | 10/2019 | Frolikov ............... G06F 9/4881 |
| 2019/0332276 A1 | 10/2019 | Gupta et al. |
| 2020/0136943 A1* | 4/2020 | Banyai ................ H04L 41/5019 |

\* cited by examiner

NVME QUEUE MANAGEMENT MULTI-TIER STORAGE SYSTEMS

BACKGROUND

The present disclosure relates to storage systems, and, more specifically, to improving queue management in multi-tier storage systems.

Solid state memory systems (e.g., flash, solid-state disks (SSD), etc.) have many benefits over traditional hard disk drives (HDD). Solid state is faster and has no moving parts that can fail. However, many interface standards were developed to operate with the moving parts of a traditional HDD (e.g., Serial Advanced Technology Attachment (SATA), Serial Attached Small Computer System Interface (SAS), etc.). There are new protocols that are designed for faster data transfer between servers, storage devices, flash controllers, and other similar components. These new systems can provide a register interface and command set that enables high performance storing and retrieving of data in a storage medium.

SUMMARY

Disclosed is a computer-implemented method to manage I/O queues in a multi-tier storage system. The method includes identifying, by a storage system, a set of subsystems, the storage system is a multi-tier storage system, the storage system is a virtualized storage system, the storage system includes a plurality of cores, and each subsystem in the set of subsystems are communicatively connected to the storage system via a non-volatile memory express (NVMe) protocol, and correlated to a tier of the multi-tier storage system. The method also includes, determining a workload of each extent in a set of extents, wherein each extents of the set of extents are stored on one subsystem of the set of subsystems and the extents are accessed by an application. The method further includes, mapping, based on the workload of each extent, each extent to a core of the plurality of cores, wherein the mapping is configured such that each core is balanced. The method includes, establishing, based on the mapping, an input/output queue (IOQ) for each extent, wherein the IOQ is processed by the core to which it is mapped. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
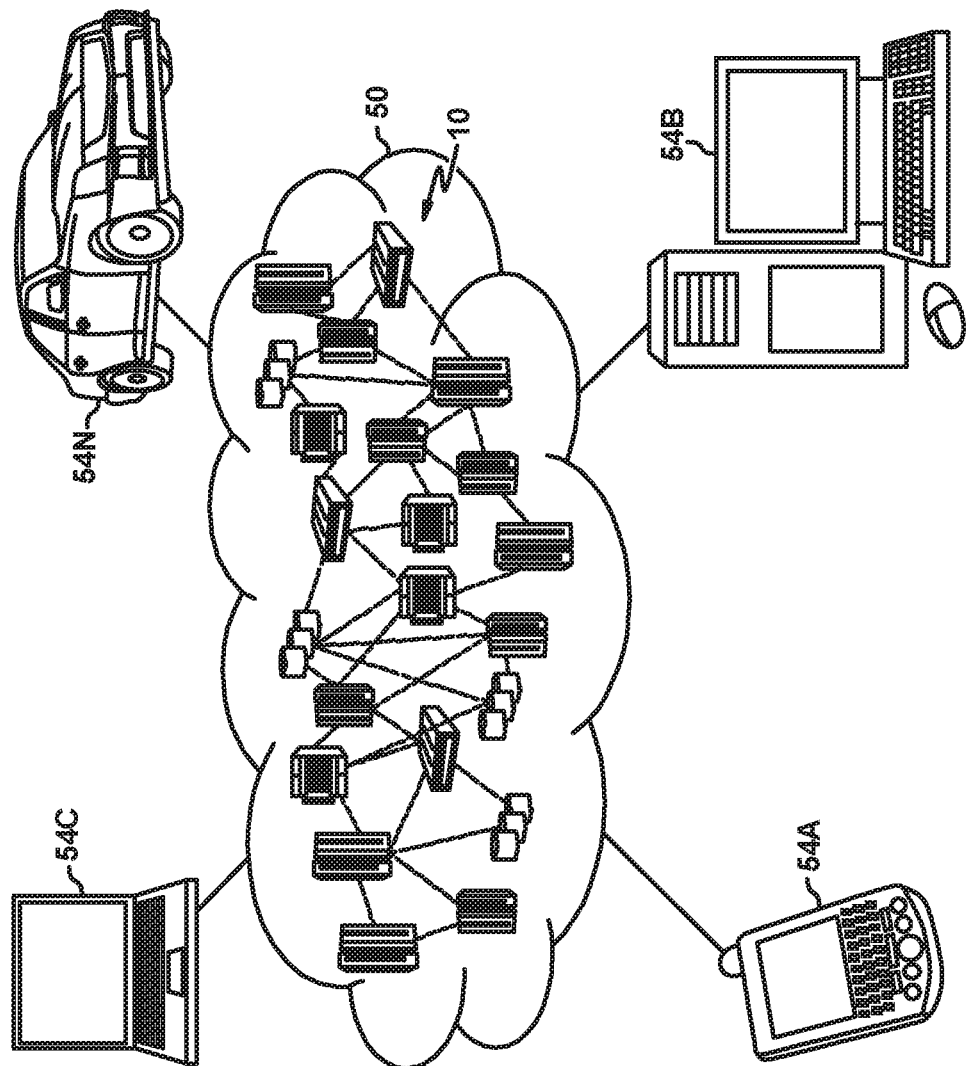
FIG. 1 depicts a cloud computing environment according to an embodiment of the present invention.

Many modern storage systems are virtualized and multi-tier. Multi-tiered storage is a storage method where data is stored on various types of storage devices. The top tiers are generally fast, small in capacity, and expensive. Data that is likely to be used frequently can be stored in a faster tier. Lower tiers are slow, high capacity, and relatively inexpensive. As extents are migrated between tiers, one or more associated cores may become overloaded or underloaded, causing performance degradation.

In order to better utilize computing resources in multi-tier storage systems, embodiments of the present disclosure may identify potential core overload/underload situations. Embodiments of the present disclosure re-map core to extents to IOQ's based on extent workload, thereby saving computing resources and increasing the overall efficiency of the system.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
NQN NVMe qualified name
NVMe Non-volatile Memory Express
NVMe-oF NVMe over Fabrics
PaaS platform as a service
PCLe peripheral component interconnect express PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
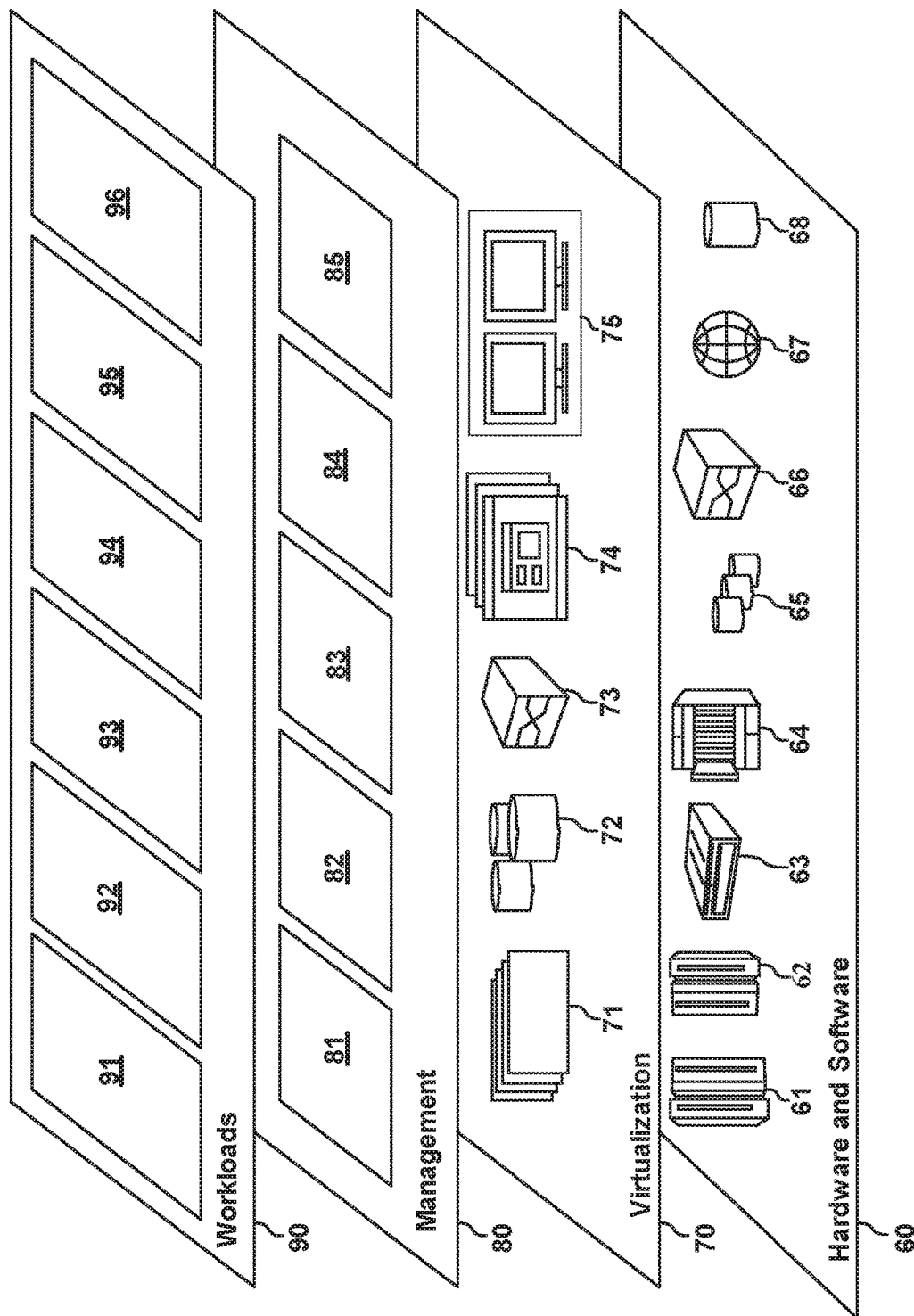
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
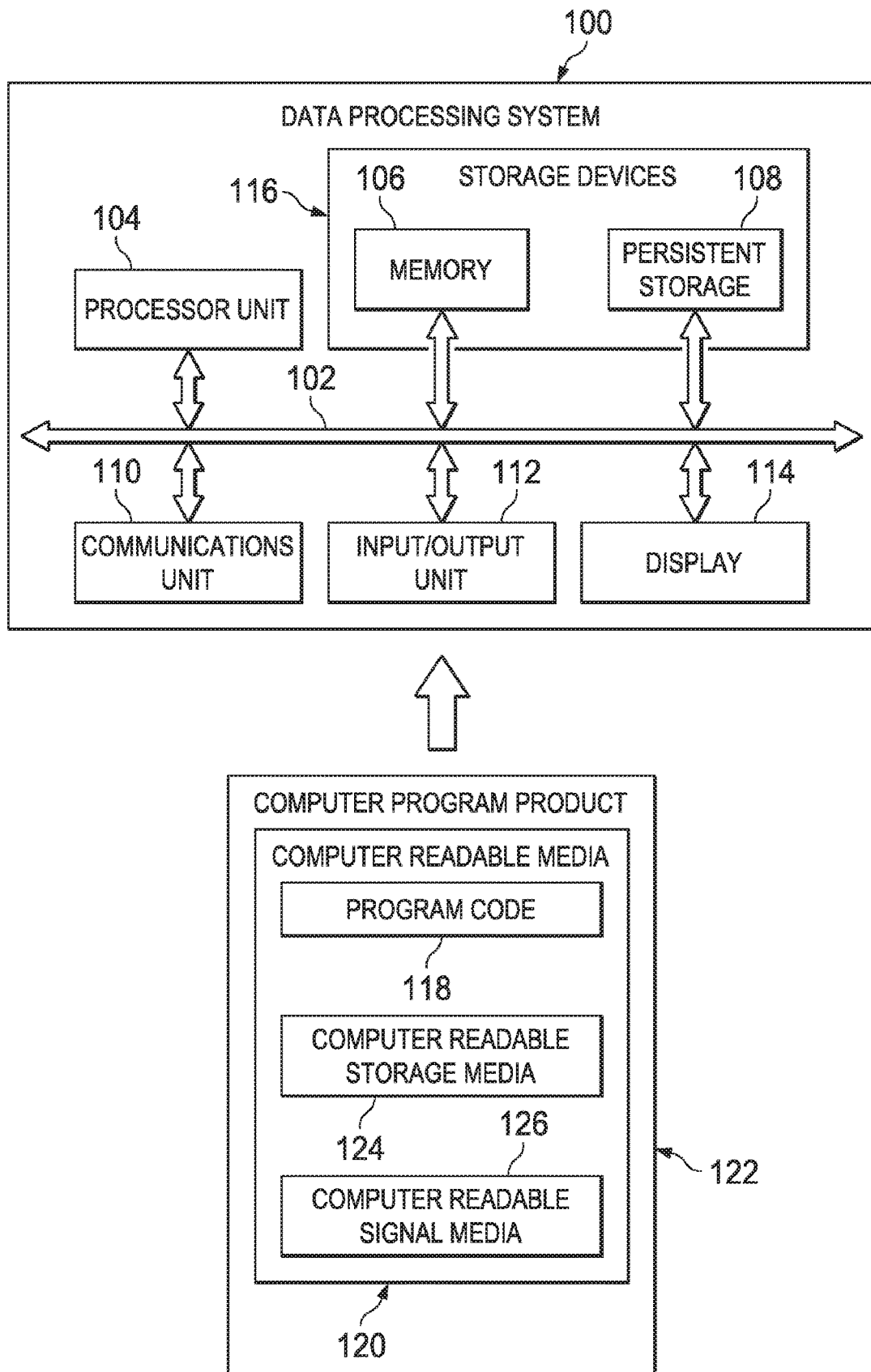
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

NVMe Queue Manager in Multi-Tier Storage Systems

NVMe is a storage protocol that is designed for relatively fast data transfer between servers, storage devices, and Flash Controllers that typically uses a peripheral component interconnect express (PCIe) bus. The specification of NVMe provides a register interface and a command set that enables high performance Input/Output (I/O). This is an alternative to the traditional Small Computer System Interface (SCSI) standards (and other standards like SAS, SATA, etc.) for data transmission across the hosts and storage systems. One of the advantages of NVMe-based Peripheral Components Interconnect Express (PCIe) Flash over SAS and SATA-based SSDs is reduced latency of access in the host software stack, leading to higher inputs outputs per second (IOPS) and lower computing resource utilization.

NVMe supports parallel I/O processing with multicore servers that results in faster I/O dispensation that leads to reduction in I/O latency. Since there are multiple cores that are processing I/O requests simultaneously, system performance increases due to optimal utilization of CPU resources. Additionally, NVMe is designed in a way that it expects to use a lesser number of CPU instructions per I/O. NVMe also supports 64,000 commands in a single message queue and 65,535 I/O queues.

NVMe of fabrics (NVMe-oF) is an extension to local PCIe NVMe that allows the benefits of NVMe-like high-performance and low-latency across network fabrics. Servers and storage devices can be connected over an Ethernet network or a fiber channel, and both of these interconnects support NVMe commands over the fabric that extends the advantages of NVMe protocol to interconnected system components.

NVMe-oF supports multiple I/O queues for regular I/O operation from host to storage systems. In some scenarios, NVMe can support up to ~65000 queues supported by NVMe with approximately ~64000 entries in each queue. The host driver generally creates the queues once a connection is established. Once the host is connected to the target system, a special purpose queue is created upon association (e.g., an Admin Queue). As the name suggests, the Admin Queue is used to transfers control commands from an initiator to the target device. Once the Admin Queue is created, it is used by the host to create I/O queues based on system requirements. The host may establish multiple I/O queues to a single controller with the same NVMe qualified name (NQN) and have multiple namespaces (or Volumes) mapped to it. A volume can be a set of data (e.g., one or more extents, etc.) An NQN is a naming convention used to identify a connection between a host and a remote storage system. Once I/O queues are established, I/O commands are submitted to the I/O Submission Queue (SQ) and I/O responses are collected from the Completion Queue (CQ). These I/O queues can be added or removed using control instructions sent via the Admin Queue for that session.

When a command is received on the target device for I/O queue creation, it performs initial system checks for max supported queues and other relevant fields and creates an I/O queue and assigns this I/O queue to a CPU core on the storage controller. Once done, a response to the queue creation request is returned via the Admin Completion Queue. Each I/O Queue is assigned to specific CPU core by the storage controller. This allows parallelism and boosts throughput of the system. Core assignment logic is implemented at the target storage controller and I/O queues to core mapping is performed based on a predefined policy at the Storage Controller. At the time of queue creation, the NVMe driver creates the direct memory access (DMA) pool of Physical Region Pages for allocating the DMA-able memory space in the target and initiator devices. These pools are created for the I/O queues and memory from the pool is reserved for the I/O's coming to that Queue. A DMA pool is an allocation mechanism for relatively small, coherent DMA mappings. Some systems allocate large amounts of DMA-able memory for the I/O Queues for performing I/O operations.

Multi-tiered storage is a storage method where data is stored on various types of storage devices. The top tiers are generally fast, small in capacity, and expensive. Data that is likely to be used frequently can be stored in a faster tier. Lower tiers are slow, high capacity, and relatively inexpensive. Data that is infrequently used can be stored in slower tiers. For example, solid-state drives can be used as higher tiers, and tape drives can be used as lower tiers. In this way, multi-tier storage can improve the overall efficiency of the system.

In some embodiments, multi-tiered storage systems also include storage virtualization. Storage virtualization is a storage protocol such that to a host, all storage media appear as a single pool of storage. Processes and controllers within the virtualized storage may manage at which tier data is managed. Data may be organized by volumes; each volume includes a plurality (set) of extents. In some embodiments, the virtualized storage system manages data at an extent level, and extends from the same volume may be stored in different devices and/or tiers.

Determining in which tier to store data may be based on several factors. Some of these factors may include number (amount) of accesses, frequency of use, data recovery requirements, and the like. For example, data that is relatively frequently accessed by an application that is response time sensitive might be stored on high tier SSD's. In contrast, data that is relatively infrequently accessed (and/or for which a higher response time is more tolerable) may be stored on lower tier disk drives and/or tape drives. Generally high tiers are faster and more expensive per unit of storage than low tiers. One challenge in effectively using multi-tiered storage is identifying the data that benefits from the higher cost/higher performance storage tiers. This may be challenging because, over time, the tier that provides the relative efficiency gain for a give piece of data may change. Thus, the identification and movement of data to the appropriate tier is an ongoing process.

In some embodiments, of a multi-tier storage system, multiple dissimilar storage devices (or backend controllers) are connected to a storage virtualization engine that includes data tiering and migration capabilities. When using NVMe protocol, I/O queues (IOQ) are created between the virtualization engine and individual storage devices. Virtualized storage may shift migrate extents of data However, in some current systems, storage device configurations and capabilities, and I/O workloads and outlooks are not being considered while creating, managing, and/or migrating extents between tiers. This may lead to core imbalance and loss of parallelism, causing the overall efficiency to drop at the host and/or the storage devices.

Embodiments of the present disclosure can identify current and potential IOQ to core mappings that may lead to performance degradation. In some embodiments, a queue manager identifies and remediates degradation conditions. Degradation may occur when one or more cores in a storage system is overloaded and/or underloaded. These conditions may arise during a change in the virtualized storage system configuration (e.g., adding a new storage device/tier), and/or during extent migration.

Thus, embodiments of the present disclosure may reduce core overload. Since the storage controller disconnects and reinitiates the I/O Queue to the backend controller based on the tiering movement map before the extent migration to same or different tiers, the storage controller rebalances the Queues across the cores before extent migration and hence the storage and host applications may get a better throughput for each I/O while maintaining parallelism.

Embodiments of the present disclosure may provide an increase in system performance that may be realized at the host(s) and/or the storage system. These embodiments may modify queue-to-core logic based on how many extents are present on the storage system with their heat counters so an overall performance degrade could be avoided with this solution.

Embodiments of the present disclosure may improve load balancing across all cores. As the extent access load is balanced across the cores in the storage system based on the type of external controller and access heat temperature, this creates equilibrium of CPU workload in the storage system and hence more balanced storage system.

Embodiments of the present disclosure may be implemented on currently existing systems. The embodiments may be implemented with the current storage system architecture and serve as a real-time problem solution for NVMe based storage systems.

In some embodiments, a queue manager identifies a new storage device is added to a virtualized storage system. The queue manager may identify all current established IOQ, their relative load, and to which core they are mapped. In some embodiments, the IOQ data is stored as a tuple for each queue. In some embodiments, the queue manager obtains capability data for the new storage device. An extent migration plan is generated that accounts for the relative workload of each IOQ, the speed of the storage system, and other similar factors. In some embodiments, the extents are migrated based on the migration plan. This may involve terminating and/or establishing IOQs between the cores and the devices as necessary.

In some embodiments, the queue manager receives an extent migration signal. A migration manager may generate the migration signal. In response the signal, the queue manager may identify all current established IOQ, their relative load, and to which core they are mapped. In some embodiments, the IOQ data is stored as a tuple for each queue. In some embodiments, the queue manager receives the migration plan, and may assign each IOQ to a core based on the predicted workload of each IOQ and/or the capabilities of the storage tier.

The aforementioned advantages are example advantages, and embodiments exist that can contain all, some, or none of the aforementioned advantages while remaining within the spirit and scope of the present disclosure.

Figure 4:
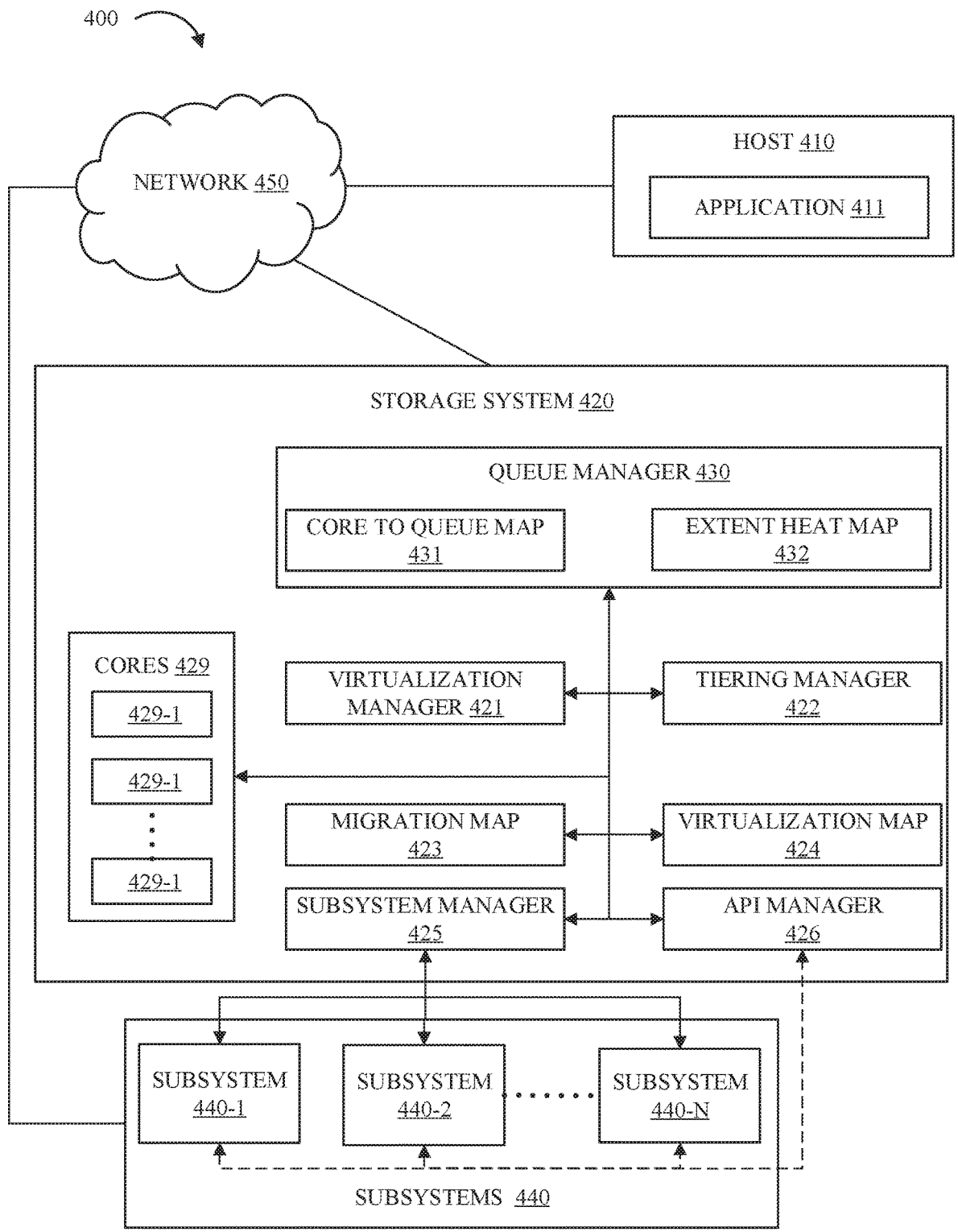
FIG. 4 illustrates a functional diagram of a computing environment suitable for operation of a queue manager, in accordance with some embodiments of the present disclosure.

Referring now to various embodiments of the disclosure in more detail, FIG. 4 is a representation of a computing environment 400, that is capable of running a queue manager in accordance with one or more embodiments of the present disclosure. Many modifications to the depicted environment may be made by those skilled in the art without departing from the scope of the disclosure.

Computing environment 400 includes host 410, storage system 420, tiered subsystem 440, and network 450. Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between host 410, storage system 420, tiered subsystem 440, and other computing devices (not shown) within computing environment 400. In some embodiments, network 450 includes a NVMe-oF connections and protocols. In some embodiments, host 410, storage system 420, and tiered subsystem 440 may include a computer system, such as the computer system of FIG. 3.

Host 410 can be a standalone computing device, a management server, a web server, a mobile computing device, or any other electronic device or computing system capable of receiving, sending, and processing data. In some embodiments, host 410 can represent a server computing system utilizing multiple computers as a server system, such as in a cloud computing environment. In some embodiments, host 410 represents a computing system utilizing clustered computers and components (e.g., database server computers, application server computers, etc.) that act as a single pool of seamless resources when accessed within computing environment 400. In some embodiments, computing environment 400 includes more than hosts, consistent with host 410. In some embodiments, host 410 includes application 411.

Application 411 can be any combination of hardware and/or software configured to perform a function (e.g., messaging application, etc.) on host 410. In some embodiments, application 411 includes two or more separate applications. Application 411 may be configured to utilize the functionality of storage system 420. This may include sending and receiving I/O requests and/or other data. In some embodiments, application 411 accesses data volumes (or volumes) maintained in storage system 420.

Storage system 420 can be any combination of hardware and/or software configured to store data and provide data to one or more computing devices (e.g., host 410). In some embodiments, storage system 420 includes a multi-tier storage system. There may be any number of tiers. The higher tiers refer to faster, generally more expensive data stores (e.g., SSD). Lower tiers refer to slower, generally less expensive data storage (e.g., HDD, tape drives). In various embodiments, there may be any number of tiers, and each tier may include one or more storage modules. In some embodiments, storage system 420 includes a virtualized storage system. The virtualization presents the storage system as a single unit, rather than several tiers of smaller storage. In some embodiments, storage system 420 includes virtualization manager 421, tiering manager 422, migration map 423, virtualization map 424, subsystem manager 425, API manager 426, queue manager 430, and subsystems 440.

Virtualization manager 421, can be any combination of hardware and/or software configured to virtualize storage system 420. In some embodiments, storage system 420 comprises a plurality of individual storage system (subsystems). Virtualization manage 421 may store data relating to the capabilities and/or capacities of each subsystem and present a compiled view to host 410.

Tiering manager 422 can be any combination of hardware and/or software configured to balance/manager extents across the storage subsystems. In some embodiments, each data volume is comprised of a plurality of extents. Each extent may be stored in the same or different subsystem than the other extents. In some embodiments, migration map 423 generates and updates extent heat map 432. In some embodiments, migration map 423 identifies one or more extents to migrate to a different subsystem. The migration signal may then be generated. The migration determination may be based on application 411, extent access rate, priority of access, and other similar factors.

Migration map 423 can be any combination of hardware and/or software configure to show an extent migration plan. In some embodiments, tiering map 423 is generates migration map 423. This may be in response to tiering manager 422 determining extent migration is warranted. It may also be in response to a new subsystem being connected to storage system 420.

Virtualization map 424 can be any combination of hardware and/or software configured to identify and store data paths and connections in a virtualized storage system. In some embodiments, virtualization map 424 maintains a table of each extent and which system it is currently assigned. Virtualization map 424 may be updated in response to a migration.

Subsystem manager 425 can be any combination of hardware and/or software configured to establish and maintain connections to subsystems. In some embodiments, subsystem manager 425 establishes and terminates IOQ's, including admin queues with each subsystem 440. In some embodiments, subsystem manager 425 transfers data between includes an asynchronous event requests (AER). The AER may include instruction to subsystems to disconnect and reconnect or disestablish and re-establish IOQ between a core and a subsystem.

API manager 426 can be any combination of hardware and/or software configured to provide out of band communication. In some embodiments, API manager 426 can pass data between from storage system 420 to subsystems 440 outside of standard NVMe protocols. The data may be in an API. The data contained in the API may include the same instruction as data an AER. The out of band allows for communication independent from NVMe processes.

Cores 429 can be any combination of hardware and or software configured to process data according to instructions. Cores 429 may also be referred to as CPU's and processors. Cores 429 includes core 429-1, core 429-2, to core 420-n. Cores 429 may refer to cores 429-1 to 429-n collectively or representatively.

In some embodiments, each of cores 429 are assigned one or more IOQ, and/or extents to process. These core assignments may be changed to maintain load balance between cores 429.

Queue manager 430 can be any combination of hardware and or software configured to set up and maintain IOQs. In some embodiments, queue manager 430 manages IOQ and/or extent distribution across each core. Queue manager 430 may analyze extent transfer plans to determine which IOQ should be assigned to which cores. In some embodiments, queue manager 430 includes core to queue map 431, and extent heat map 432.

Core to queue map 431 can be a data set that identifies how IOQ are mapped to individual cores. In some embodiments, core to queue map 431 is analyzed to determine when a core may be overloaded or underloaded. In some embodiments, core to queue map 431 may be analyzed to determine how to assign IOQ's to cores. The map may show prospective mappings and/or current mappings.

Extent heat map 432 can be a data set that shows the relative parameters of each extent. Extent heat map 432 may include a tuple for each queue. The relative parameters may include access information (e.g., number of accesses per time), priority of requests, and other similar information. Extent heat map 432 may be used to determine when extent migration should be performed. It may also be used to determined which extents to migrated to a higher tier, and which to a lower tier.

Subsystems 440 can be any number of individual storage devices. In some embodiments, each device is a different tier of a multi-tier storage system. Subsystem 440-1, to 440-n, which may be referred to as subsystems 440 collectively or representatively. Subsystems 440 may SSD, HDD, tape drives, or any other type or data storage.

In some embodiments, each subsystem 440 includes a controller (or backend controller). The controller may manage the connections and the data processing on the storage device.

Figure 5:
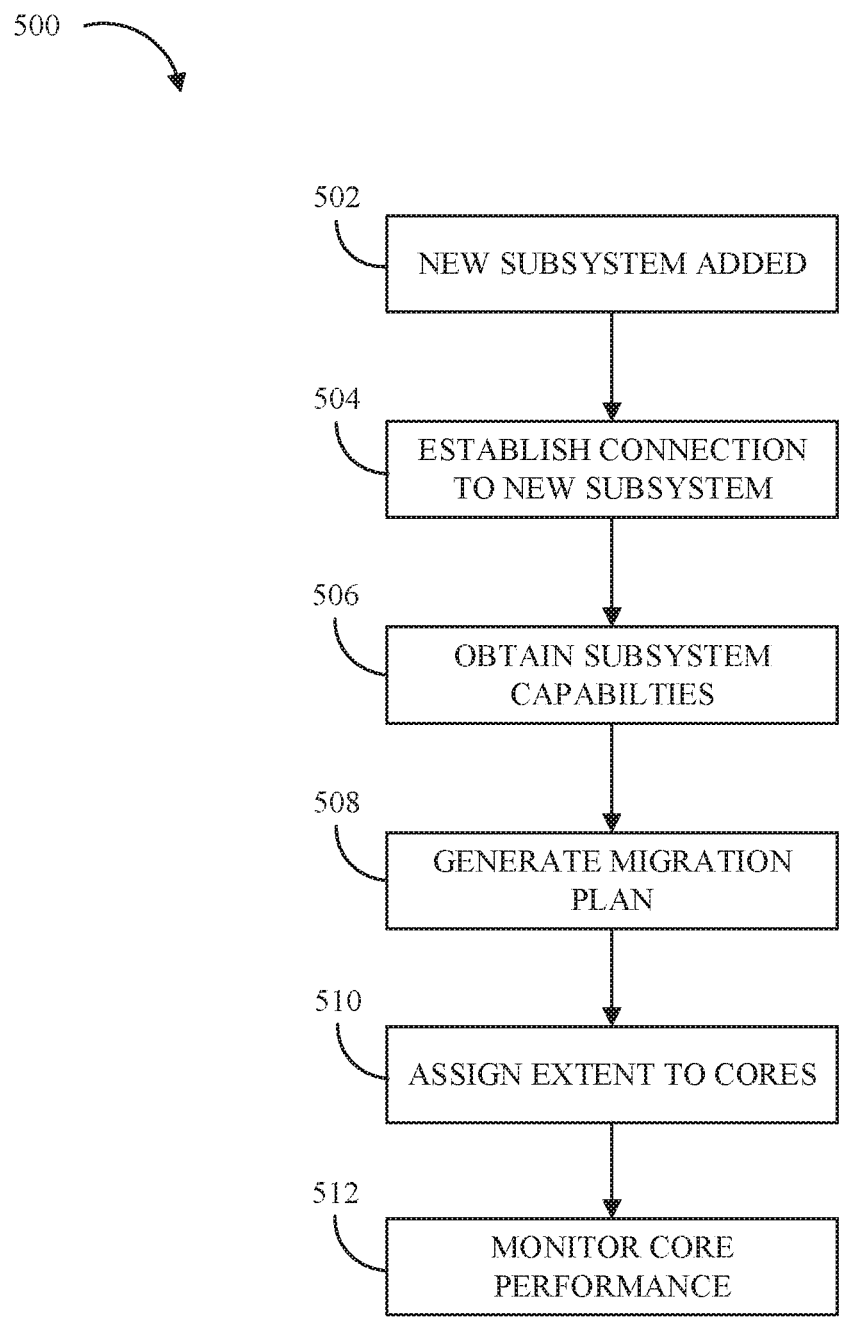
FIG. 5 illustrates a flow chart of an example method to balance I/O queue's in response to a new storage subsystem, in accordance with some embodiments of the present disclosure.
Figure 6:
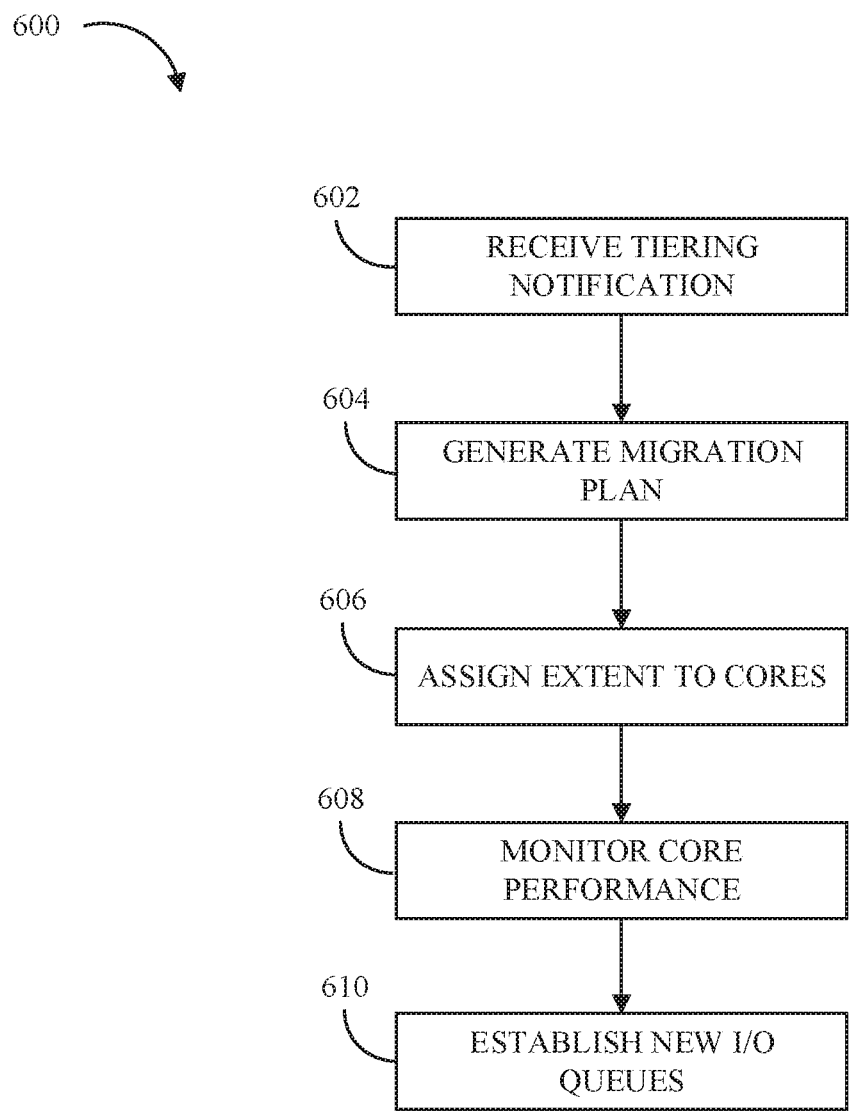
FIG. 6 illustrates a flow chart of an example method to maintain I/O queue balance during extent migration, in accordance with some embodiments of the present disclosure.

FIG. 5 and FIG. 6 depict a flowchart of an example methods for managing I/O queues in a multi-tier storage system that can be performed in a computing environment (e.g., computing environment 400). One or more of the advantages and improvements described above for identifying and correcting duplicate queues may be realized by methods 500-600, consistent with various embodiments of the present disclosure.

Method 500 can be implemented by one or more processors, host 410, storage system 420, queue manager 430, subsystems 440, their subcomponents and/or a different combination of hardware and/or software. Method 500 includes an example method of establishing necessary queues and/or not establishing unnecessary I/O queues on a storage system. In various embodiments, the various operations of method 500 are performed by one or more of host 410, storage system 420, queue manager 430, subsystems 440, and the subcomponents of each of the foregoing. For illustrative purposes, the method 500 will be described as being performed by queue manager 430.

At operation 502, queue manager 430 determines (or identifies) a subsystem is added to storage system 420. In some embodiments, the added subsystem may be a new subsystem (e.g. has not been in storage system before) or a previous subsystem that is returning to service (e.g., after being shut down for maintenance). In some embodiments, reassigning a subsystem to a new tier (or adding a new tier) may be treated as a new subsystem. In some embodiments, subsystem manager 425 identifies the new subsystem. In some embodiments, the new subsystem sends a notification to queue manager 430 it is available. In some embodiments, operation 502 includes adding the new storage system to virtualization map 424.

At operation 504, queue manager 430 can establish a connection to the new subsystem. The connection may be configured to operate NVMe protocols. In some embodiments, establishing the connection includes creating an admin queue on the subsystem. The connection may allow storage system 420 and the new subsystem to exchange data.

At operation 506, queue manager 430 obtains the new subsystems capabilities. This may include data such as storage capacity, speed, bandwidth, availability, type (e.g., SSD), and or other similar data. In some embodiments, the obtained capabilities include a tier. In some embodiments, a tier is assigned to the subsystem based on the capabilities. The assignment may be performed by virtualization manager 421.

At operation 508, queue manager 430 a migration plan. In some embodiments, the migration plan is generated by tiering manager 422. In some embodiments, the plan is generated by queue manager 430. In some embodiments, the map is stored in migration map 423. In some embodiments, the migration plan includes current and future assignments.

In some embodiments, the migration plan maps each extent (and its associated IOQ's) to a core. The map attempts to even the workload across the core, thereby maintaining parallelism and prevent performance degradation. The migration plan may predict the relative workload of each extent. The predictions may be based on, extent usage, type of subsystem, tier of subsystem, and other similar factors. For example, if there are two hot extents (heavily accessed) and a new subsystem is added, the migration plan may map these two hot extents to different cores, even if they are assigned to the same tier/subsystem. Consider the two hot extents were assigned to the same core, that core may be overloaded, and efficiency may go down.

In some embodiments, extent usage may be based on extent heat map 432. Heat map 432 may track each access to the extent, and the relative importance of the access (e.g., high priority). This data may be used to calculate a heat score. In some embodiments, the extents are ranked from highest load to lowest. The rank may be used to generate the migration plan. For example, if there are 8 extents and for cores, then the migration plan may be core 1 with rank 1 and 8, core 2 with rank 2 and 7, etc. Another example, core 1 may include rank 1, core 2 rank 2, core 3 rank 3, 4, and 5, and 6, and core 4 ranks 6, 7, and 8.

At operation 510, queue manager 430 assigns the extents to their cores. In some embodiments, operation 510 may include terminating old IOQs and recreating new IOQs. For example, if the migration plan transferred an extent from core 429-2 to core 429-3 and the extent is currently stored on subsystem 440-1, then core 429-3 may need to establish a connection to subsystem 440-1. After the connection is complete, queue manager 430 may check to see if core 429-2 is supporting any extents on subsystem 440-1. If not, the IOQ's may be terminated.

At operation 512, queue manager 430 monitors core performance. In some embodiments, the monitoring is performed by a monitoring daemon. The monitoring demon may track overall workload. In some embodiments, the performance is monitored by analyzing subsystem performance, tiering manager 422, and/or extent heat map 432. A change in one of the foregoing or other data may show load imbalance. For example, an extent that had a high heat value when the migration plan was generated may lose heat, and a second extent that had a low heat value may gain heat. This may cause a core imbalance. Another example, if an extent is migrated to a lower tier, that may cause less demand on the associated core based on the slower speed of the subsystem. This may cause the associated core to be underloaded. This reduces the overall efficiency of the system.

If the monitoring determines there may be a load imbalance, queue manager 430 may return to operation 508, and generate a new access plan. Thus, the extents may be re-assigned as needed to prevent core overload and underload.

Method 600 can be implemented by one or more processors, host 410, storage system 420, queue manager 430, subsystems 440, their subcomponents and/or a different combination of hardware and/or software. Method 600 includes an example method for maintaining load balancing during extent migration. In various embodiments, the various operations of method 600 are performed by one or more of host 410, storage system 420, queue manager 430, subsystems 440, and the subcomponents of each of the foregoing. For illustrative purposes, the method 500 will be described as being performed by queue manager 430.

At operation 602 queue manager 430 receives tiering notification. The tiering notification indicates at least one extent is migrating between subsystems. If no action is taken, this may cause one or more cores to be overloaded or underloaded. In some embodiments, the tiering notification includes the tiered plan (e.g., which extents are moving to which subsystems).

At operation 604, queue manager 430 generates a migration plan. At operation 606, queue manager 430 assigns extents to cores. At operation 608, queue manager 430 monitors core performance. In some embodiments, operation 604, operation 606, and operation 608, are consistent with operation 508, operation 510, and operation 512 or FIG. 5, respectively.

At operation 610, queue manager 430 establishes new I/O queues. In some embodiments, the new I/O queues are in response to operation 608. In some embodiments, the new I/O queues may be in response to identifying one or more cores are overloaded and/or overloaded. The new I/O queues may be configured to balance core loads. This does not necessarily mean each core is mapped to the same number of extents, subsystems, etc. Rather that each core has a similar IOPS. For example, one core may me mapped to several extents on lower tier (slower) subsystems and have the same IOPS as a different core that is processing a single hot extent on a high tier (faster) subsystem.

Computer Technology and Computer Readable Media

The one or more embodiments disclosed herein accordingly provide an improvement to computer technology. For example, an improvement to a search engine allows for a more efficient and effective search for information by the user. The ability to access stored information with which the user has interacted with in some manner, and allowing the weighting of the importance of this information to decay over time beneficially improves the operation of the search and benefits the user in that more pertinent results may be presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying, by a storage system, a set of subsystems, wherein:
the storage system:
is a multi-tier storage system;
includes a plurality of cores; and
each subsystem in the set of subsystems is:
communicatively connected to the storage system via a non-volatile memory express (NVMe) protocol; and
correlated to a tier of the multi-tier storage system;

adding a new subsystem to the storage system, wherein the adding includes establishing a connection to the new subsystem, retrieving, from the new subsystem, a set of capabilities of the new subsystem and assigning, based on the set of capabilities, the new subsystem to a tier of the storage system;

generating a migration plan, in response to the adding of the new subsystem, wherein the migration plan is configured to move a set of extents between two or more subsystems of the set of subsystems including at least a first extent from a first subsystem of the set of subsystems to a second subsystem of the set of subsystems, and the generating the migration plan includes:

determining a predicted workload for each extent of the set of extents;

generating a current map of core assignment for each extent; and generating a prospective map, where the prospective map is based on the predicted workload of each extent and the prospective map maps each extent to a core of the plurality of cores, wherein the prospective map is configured such that each core is balanced;

assigning, based on the prospective map each extent to the mapped core; and establishing, based on the assigning, an input/output queue (IOQ) for each extent including a first IOQ for a first extent by a first core of the plurality of cores and a second IOQ for a second extent on the first core, wherein each 100 is processed by the mapped core of the plurality of cores.

2. The method of claim 1, wherein the new connection comprises an admin queue.

3. The method of claim 2, wherein the set of capabilities includes a type of storage and a storage capacity.

4. The method of claim 2, wherein the set of capabilities are received via the new connection.

5. The method of claim 2, wherein the set of capabilities are received via an out of band communication that comprises an application programming interface (API).

6. The method of claim 1, wherein identifying the set of subsystems is in response to:

receiving, from a tiering manager, a signal indicating a third extent of the set of extents is migrating from a first tier to a second tier.

7. The method of claim 1, further comprising:
generating a tuple for each extent;
wherein:
the tuple comprises an extent identifier, an extent access rate, the mapped core, the subsystem each extent is stored on; and
the mapping of each extent to the core of the plurality of cores is based on the tuple for each extent.

8. The method of claim 1, wherein the predicted workload of the first extent is based on a type of the first subsystem, and a tier of the first subsystem.

9. The method of claim 8, wherein the migration plan is based on a rank of each extent.

10. The method of claim 1, wherein each core of the plurality of cores are mappable any subsystem of the plurality of subsystems.

11. The method of claim 1, wherein the first extent is stored on a first subsystem, and the second extent is stored on a second subsystem.

12. The method of claim 10, further comprising:
monitoring a workload for each core determining, in response to the monitoring, the first core is overloaded, and the first extent of the set of extents and the second extent of the set of extents are mapped to the first core;

identifying, in response to the monitoring, a second workload of a second core of the plurality of cores is less than a first workload of the first core; and re-mapping, based on the identifying, the second extent to the second core, wherein the re-mapping includes establishing a third IOQ for the second extent on the second core and terminating the second IOQ for the second extent on the first core.

13. The method of claim 9, wherein a highest ranked extent and a lowest ranked extent as assigned to the same core.

14. The method of claim 9, wherein the a highest ranked extent is assigned to the first core and a second ranked extent is assigned to a second core of the plurality of cores.

15. The method of claim 9, wherein a highest ranked core is assigned to the first core, and no other extent is assigned to the first core.

16. A system comprising:
a processor; and
a computer-readable storage medium communicatively coupled to the processor and storing program instructions which, when executed by the processor, are configured to cause the processor to:
identify, by a storage system, a set of subsystems, wherein:
the storage system:
is a multi-tier storage system;
stores a set of set of extents, wherein each extent is stored on one subsystem of the set of subsystems;
includes a plurality of cores, wherein each core is assigned to process at least one extent of the set of extents, and each core of the plurality of cores is mappable to all subsystems of the set of subsystems; and
each subsystem in the set of subsystems is:
communicatively connected to the storage system via a non-volatile memory express (NVMe) protocol, and
correlated to a tier of the multi-tier storage system;
add a new subsystem to the storage system, wherein the adding includes establishing a connection to the new subsystem, retrieving, from the new subsystem, a set of capabilities of the new subsystem and assigning, based on the set of capabilities, the new subsystem to a tier of the storage system;
generate a migration plan, in response to adding the new subsystem, wherein the migration plan is configured to move at least one extent of the set of extents between two or more subsystems of the set of subsystems including a first extent from a first subsystem of the set of subsystems to the new subsystem;
determine a predicted workload of each extent in the set of extents;
map, based on the predicted workload of each extent, each extent to a core of the plurality of cores, wherein the mapping is configured such that each core is balanced; and
assign, based on the mapping, each extent to the mapped core, wherein the assigning includes establishing an input/output queue (IOQ) for each extent including a first IOQ for the first extent between the mapped core and the new subsystem.

17. The system of claim 16, wherein the set of capabilities comprises a type of storage and a storage capacity.

18. The system of claim 16, wherein the first IOQ is mapped to a first core program instructions are further configured to cause the processor to:
determine no extents of the set of extents assigned to the first core are stored on the first subsystem; and
terminate, in response to the determination that no extents of the set of extents assigned to the first core are stored on the first subsystem, IOQ between the first core and the first subsystem.

19. A computer program product, the computer program product comprising a computer readable storage medium having program instructions embodied therewith, the program instructions executable by a processing unit to cause the processing unit to:
identify, by a storage system, a set of subsystems, wherein:
the storage system:
is a multi-tier storage system;
includes a plurality of cores, wherein each core of the plurality of cores are mappable to all subsystem of the set of subsystems; and
each subsystem in the set of subsystems is:
communicatively connected to the storage system via a non-volatile memory express (NVMe) protocol, and
correlated to a tier of the multi-tier storage system;
add a new subsystem to the storage system, wherein the adding includes establishing a connection to the new subsystem, retrieving, from the new subsystem, a set of capabilities of the new subsystem and assigning, based on the set of capabilities, the new subsystem to a tier of the storage system;
receive, by the storage system, a tiering notification, wherein the tiering notification indicates at least one extent of a set of extents stored on the storage system will be migrated between subsystems;
generate a migration plan, in response to the receipt of the tiering notification, wherein the migration plan is configured to move the at least one extent of the set of extents between two or more subsystems of the set of subsystems including at least a first extent from a first subsystem of the set of subsystems to a second subsystem of the set of subsystems;
monitor a workload for each core of the plurality of cores;
determine a predicted workload of each extent in a set of extents;
rank, based on the predicted workload, each extent of the set of extents;
map, based on the predicted workload of each extent, each extent to a core of the plurality of cores, wherein the mapping is configured such that each core is balanced, and each core of the plurality of cores are mappable to all subsystem of the set of subsystems, and where the highest ranked extent and the second ranked extent are mapped to different cores;
establish, based on the mapping, an input/output queue (IOQ) for each extent including a first IOQ for a first extent on a first core of the plurality of cores and a second IOQ for a second extent on the first core, wherein each IOQ is processed by the mapped core of the plurality of cores;
determine, in response to the monitoring, the first core of the plurality of cores is overloaded, and the first extent of the set of extents and the second extent of the set of extents are mapped to the first core of the plurality of cores;
identify, in response to the monitoring, a second core of the plurality of cores, wherein a second workload of the second core is less than a first workload of the first core; and
re-map, based on the identification, the second extent to the second core, wherein the re-mapping includes establishing a third IOQ for the second extent on the second core and terminating the second IOQ for the second extent on the first core.

20. The computer program product of claim 19, wherein the new connection comprises an admin queue.

* * * * *